July 19, 1966  T. A. BUCHHOLD  3,261,210
SUPERCONDUCTIVE ACCELEROMETER
Filed Dec. 2, 1960  4 Sheets-Sheet 1
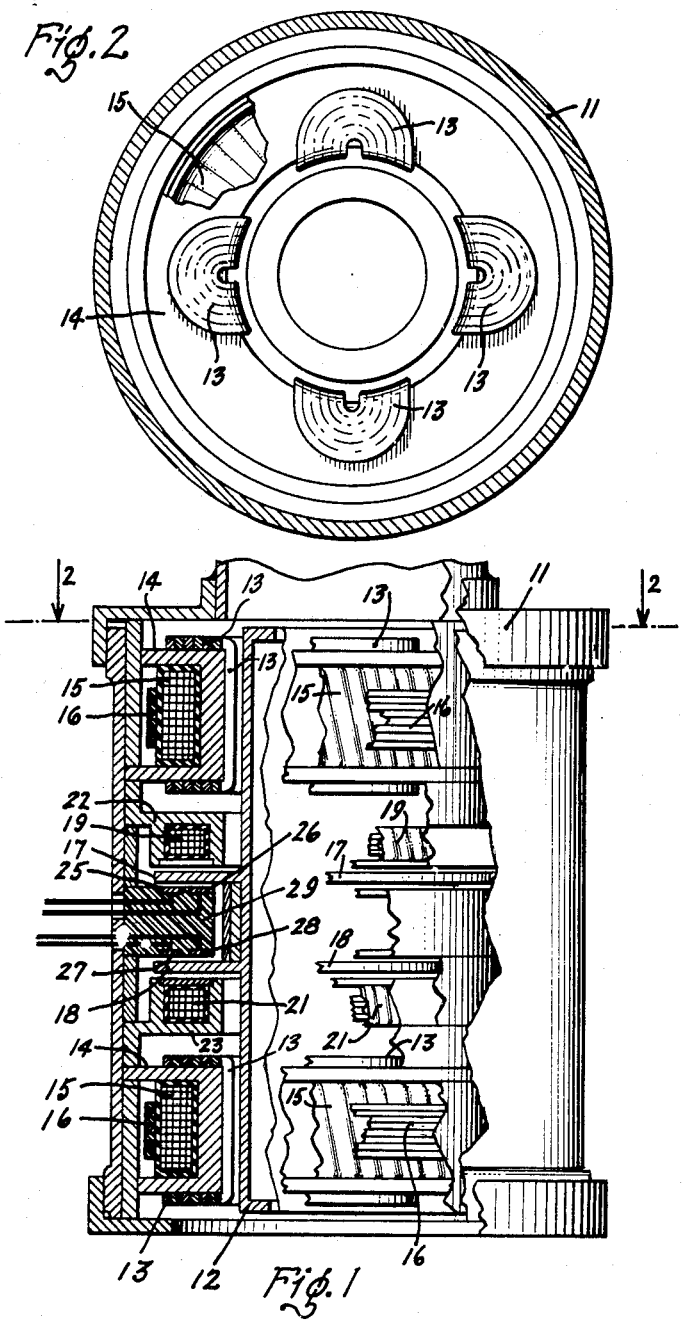
Inventor
Theodor A. Buchhold
by Charles W. Helzer
His Attorney July 19, 1966  T. A. BUCHHOLD  3,261,210

SUPERCONDUCTIVE ACCELEROMETER

Filed Dec. 2, 1960  4 Sheets-Sheet 2

Inventor:
Theodor A. Buchhold,
by Charles W. Helzer
His Attorney.

July 19, 1966  T. A. BUCHHOLD  3,261,210
SUPERCONDUCTIVE ACCELEROMETER
Filed Dec. 2, 1960  4 Sheets-Sheet 3

Inventor:
Theodor A. Buchhold,
by Charles W. Helzer
His Attorney.

July. 19, 1966 T. A. BUCHHOLD 3,261,210
SUPERCONDUCTIVE ACCELEROMETER

Filed Dec. 2, 1960

Inventor
Theodor A. Buchhold
by Charles W Helger
His Attorney

United States Patent Office 3,261,210
Patented July 19, 1966

3,261,210
SUPERCONDUCTIVE ACCELEROMETER
Theodor A. Buchhold, Schenectady, N.Y., assignor, by mesne assignments, to the United States of America as represented by the Administrator of the National Aeronautics and Space Administration
Filed Dec. 2, 1960, Ser. No. 73,367
8 Claims. (Cl. 73—517)

The invention described herein may be manufactured and used by or for the Government of the United States of America for governmental purposes without the payment of any royalties thereon or therefor.

This application relates to a new and improved accelerometer.

More particularly the invention relates to a new and improved superconducting accelerometer employing a variable force principle to determine the acceleration to which a superconducting body is subjected.

An accelerometer is an instrument for measuring the acceleration and deceleration of bodies being subjected to propelling or braking forces. With the advent of guided missiles and inertial guidance systems the need for measuring with extreme accuracy the acceleration and deceleration of bodies in space has become most urgent. The present invention makes available a superconducting accelerometer which is capable of obtaining the high accuracies required of such devices.

It is therefore a primary object of the present invention to provide a new and improved superconducting accelerometer. The accelerometer employs a novel constant current reference to which a variable current proportional to an accelerating force is added in one coil and subtracted in a second coil to develop a counter force to counter the effect of the accelerating force. The value of this variable current then provides a measure of the acceleration to which the body is subjected.

In practising the invention an accelerometer is provided which comprises a body having at least one superconductive surface suspended for movement with respect to a reference position. Electrical means are provided for producing a magnetic flux in a restraining coil that acts against the superconductive surface of the body for restraining the body close to its reference position. A source of constant electric current is operatively coupled to the electrical means. An electrical pick-up is physically disposed adjacent the body for detecting incipient movement of the body and deriving an electric error signal which is amplified and produces a current that is supplied to the restraining coil of the accelerometer and is a measure of acceleration.

Other objects, features and many of the attendant advantages of this invention will be appreciated more readily as the some becomes better understood by reference to the following detailed description, when considered in connection with the accompanying drawings wherein like parts in each of the several figures are identified by the same reference character, and wherein:

FIGURE 1 is a partially broken away side view of a preferred form of accelerometer constructed in accordance with the invention;

FIGURE 2 is a cross-sectional view of the accelerometer shown in FIGURE 1 taken through the plane 2—2;

Figure 4:
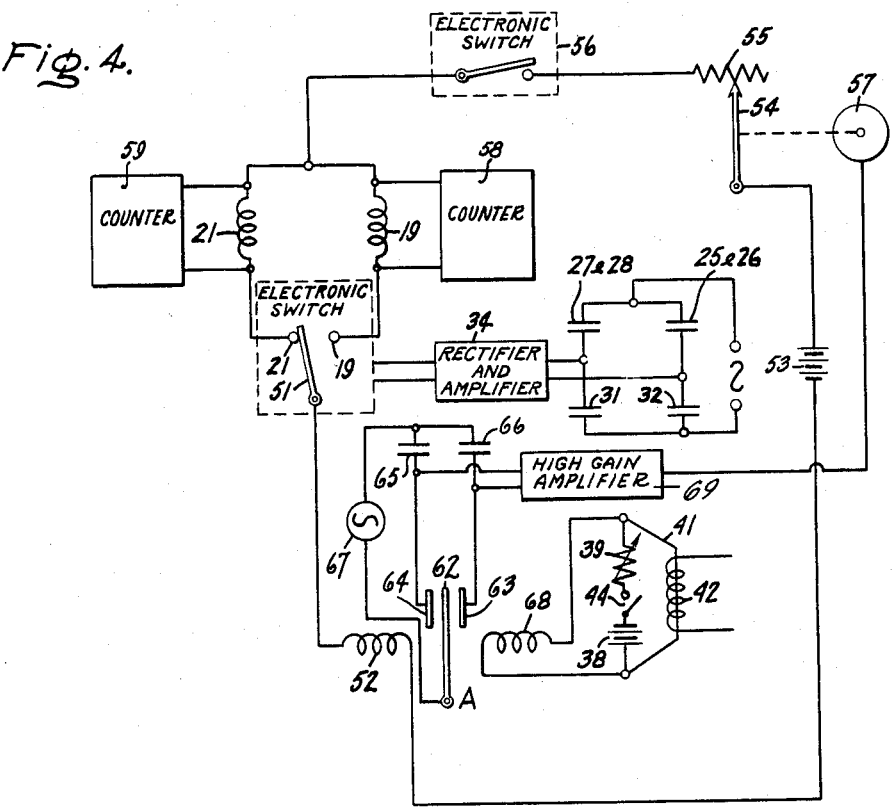
FIGURE 4 is an alternative measurement circuit arrangement for use with the accelerometer of FIGURE 1.

The accelerometer shown in FIGURE 1 of the drawings comprises a housing 11 fabricated from brass or other suitable material which is adapted to be exposed within a cryogenic fluid container surrounded by an insulating cabinet (not shown). There are a number of cryogenic containers and insulating cabinets available in the art which are suitable for use with the superconductive accelerometer in order to reduce its temperature to cryogenic regions. Hence, a further description of these portions of the device is not believed necessary. The housing 11 is cylindrically shaped, and has a cylindrically shaped armature or body 12 supported therein which is fabricated from superconducting materials. There are some 21 known different metallic elements which exhibit superconducting characteristics when their temperature is reduced to the neighborhood of 0° Kelvin (i.e., superconducting temperatures), and a large number of alloys are known which also become superconducting at various temperatures within the zero degree Kelvin temperature region. For example, potassium becomes superconducting at temperatures of .35° Kelvin while niobium becomes superconducting at 8° Kelvin. Some alloys are known to possess even higher superconducting temperatures. For example, niobium nitride becomes superconducting at approximately 15.5° Kelvin. Some of the known superconducting materials are aluminum, zinc, gallium, cadmium, indium, tin, mercury, thallium, terbium, ruthenium, rhenium, osmium, uranium, thorium, hafnium, tantalum, zirconium, niobium, boron, titanium, and lanthanum. All of the above listed elements are known to exhibit superconducting characteristics; however, some are preferred in certain applications over others. For the instant application, niobium is preferably used because it can stand high magnetic fields without losing superconductivity.

The superconducting armature of body 12 is magnetically supported within the housing 11 by a plurality of magnetic bearing coils 13 which are internally arranged around the periphery of each end of housing 11 in confronting relation with respect to the rotor or body 12. Each of the magnetic bearing coils 13 is comprised by a number of turns of relatively large cross-section superconducting wire mounted saddle fashion over an iron core member 14. As shown in FIGURE 2, there is a magnetic bearing coil in each quadrant of the cylindrical housing 11, and since there are two sets of such coils arranged on opposite ends of the cylindrical superconductive body 12, the sets of coils will serve to magnetically support the superconductive body 12 within the housing 11 in a radial direction free of any mechanical engagement. For a more complete description of the manner in which the magnetic field produced by the bearing coils 13 coact to support the superconductive body 12 reference is made to a copending application Serial No. 709,118, Bearing Construction, T. A. Buchhold, inventor, filed January 15, 1958, now Patent No. 3,026,151, issued March 20, 1962, and assigned to the General Electric Co. For the present purposes however it is believed adequate to point out that when energized with a circulating electric current, the bearing coils 13 do magnetically support the superconductive armature of body 12 within the housing 11 in a radial direction but produce no force on the body in a longitudinal direction.

In order to electrically energize the bearing coils 13, they are electrically connected to an associated secondary winding 16 of a respective supply transformer. The primary windings 15 of the supply transformer comprise a large number of turns of relatively thin cross-section superconductor wire wound in a coil around the inner periphery of housing 11 and supported within the legs of the iron core members 14. The primary windings 15 are inductively coupled to 4 secondary windings 16 each formed of one or more turns of relatively large cross-section superconductors wound in a coil around the primary windings 15. There are essentially 4 secondary windings and each one is electrically connected with its associated bearing coil. The primary windings 15 are connected to a suitable energization circuit for supplying electric current through the superconductive transformer to the bearing coils 13. It is of course possible to freeze a bearing coil current into the bearing coils 13 in the manner described in the above identified copending bearing application; however, such technique has been adequately described in the literature, and will not be described in detail.

In order to restrain the superconducting body or armature 12 along its longitudinal axes, a pair of spaced-apart flanges 17 and 18 of superconductive material are formed around the midportion of the body and preferably comprise an integral part of the body. These flanges confront respective restraining coils 19 and 21, which are comprised of a large number of turns of relatively thin cross-section superconductive wire wound in a large coil extending around the inner periphery of housing 11. The restraining coils 19 and 21 are located so that they act on opposite surfaces of the two outstanding flanges 17 and 18 thereby acting in opposition to each other so as to restrain the superconducting body 12 in a longitudinal direction relatively close to a reference position within the housing 11. For convenience, the two surfaces of the flanges 17 and 18 in confronting relation with respect to the positioning coils 19 and 21 are defined as the exterior surfaces of the flanges 17 and 18. Positioned in confronting relation to the remaining or interior surfaces of the flanges 17 and 18 are two sets of capacitive pickups 25, 26, and 27, 28 which are supported within an insulating block 29 secured midway between the ends of the cylindrical housing 11 and extending around its entire periphery. The capacitive pick-ups 25–28 comprise conductive rings likewise extending around the inner periphery of the housing 11 in confronting relation with respect to the outstanding flanges 17 and 18. The separate capacitive pick-ups 25, 26, 27, 28 in conjunction with the opposing superconducting surfaces of the outstanding flanges 17 and 18 comprise capacitive elements. These capacitive elements are connected in an electrical measuring circuit through respective electrical conductors connected to each of the pick-ups 25 through 28, and extending through the insulating block 29 to the exterior of the housing 11. By this arrangement, restraining coils 19 and 21 upon being energized will position the armature or body member 12 longitudinally in a reference position with respect to the housing 11. While being maintained in the reference position, a certain value capacitance will exist between the pick-ups 25–28 and their respective associated outstanding flanges 17 and 18. If due to some exterior force on the housing 11, such as an acceleration of the body to which the housing is secured, the freely supported armature or body member 12 will tend to move in one direction or the other with respect to its reference position depending upon the direction of acceleration. Upon this occurrence, the capacitive pick-ups 25–28 will experience a change in capacitance due to the variation in the spacing between the flanges and the pick-ups, and this change in capacitance is sensed by a sensing circuit arrangement to be described more fully hereinafter.

Figure 3:
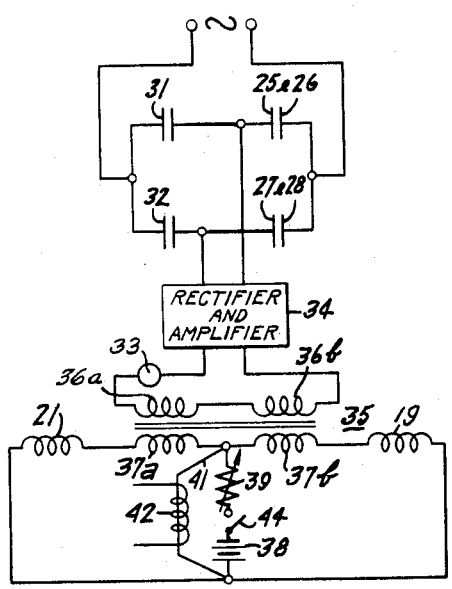
FIGURE 3 is a functional block diagram of a measurement circuit used in conjunction with the superconductive accelerometers shown in FIGURES 1–2.

A preferred form of sensing circuit for use with the accelerometer shown in FIGURES 1 and 2 of the drawings is illustrated in FIGURE 3 of the drawings. The capacitors marked 25 and 26 represent schematically the capacitive pick-up elements 25, 26 of the accelerometer shown in FIGURE 1, and the capacitors marked 27, 28 represent schematically the capacitive pick-ups formed by the pick-up heads 27 and 28 of the accelerometer. The two capacitors are connected in a Wheatstone bridge measuring arrangement with a pair of standard or reference capacitors 31 and 32, and the bridge thus formed is excited by a source of alternating current connected across one set of opposing terminals. The remaining pair of opposite terminals are connected across a high gain rectifier-amplifier circuit 34 of conventional construction and a suitable indicating meter 33 is connected to the output of the rectifier-amplifier 34 to provide an output indication of any unbalance occurring in the bridge. The output current from circuit 34 is connected to a cryogenic transformer 35 which has its primary winding split into two winding halves 36a and 36b, each of which are inductively coupled to respective superconductive winding halves 37a and 37b of a secondary winding. The two superconductive secondary windings 37a and 37b are connected in series circuit relationship with the restraining coils 21 and 19, and the circuit thus comprised is excited by a current source comprised by a battery 38, switch 44 and a variable resistor 39. The current source is connected between the junction of the two superconductive secondary winding halves 37a and 37b and one terminal of each of the superconducting restraining coils 19 and 21, and the remaining terminals of the restraining coils 19 and 21 are connected to the remaining terminals of the respective secondary winding halves 37a and 37b. The resistor 39, switch 44 and battery source 38 are bypassed by a superconducting gate element 41 surrounded by a control winding 42.

Upon placing the circuit in operation, a control current supplied to the control winding 42 destroys the superconducting gate 41 by either a strong magnetic field or by heating and hence the gate 41 that shunts the battery 38 appears resistive. Battery source 38 then provides a constant value circulating current in the branch circuits formed by the secondary winding half 37b and the restraining coil 19, and in the branch circuit formed by the secondary winding half 37a and the restraining coil 21. The current supplied upon initiating operation of the circuit to the control coil 42 of the superconducting gate 41 is then terminated. The gate 41 which is now superconducting then provides a short circuiting superconducting path around the battery source 38, switch 44 and resistor 39 so that the circuit will function to provide a constant circulating bias current $I_0$ through the two branch circuits including the restraining coils 19 and 21.

When placed in operation in the above described manner, the constant circulating bias current $I_0$ will be used as a bias current for the restraining coils 19 and 21 as will be explained more fully hereinafter. Thereafter, if the accelerometer is subjected to an accelerating force it will develop in the capacitive pick-up elements 25, 26 and 27, 28 an output error signal which will appear across the output terminals of the capacitor bridge shown in FIGURE 3. This error signal is amplified by the high gain amplifier 34, and the value of the output current will be shown by the indicating instrument 33 thereby providing a measure of the accelerating force, and hence the acceleration to which the body is subjected. This amplified error current is supplied to the two primary winding halves 36a and 36b where it is inductively coupled to the secondary winding halves 37a and 37b connected in circuit relationship with the restraining coils 19 and 21. This amplified error current denoted with an $i$ will be added to the bias current $I_0$ in one branch and subtracted from the bias current $I_0$ in the other depending of course upon the direction of the acceleration to which the accelerometer body 12 is subjected. This results in providing a corrective current to the restraining coils 19 and 21 which will tend to return the accelerometer body 12 close to its reference position.

That this current is indeed proportional to the acceleration to which the accelerometer is subjected is verified by the following set of equations.

The flux density B acting upon the superconducting flange surfaces of the accelerometer body 12 is given by the expression $$B = k_1 I \qquad (1)$$

where:

I is the coil current, and
$k_1$ is a constant.

The force resulting from the magnetic flux acting on the superconducting surface of the flange portions 17 and 18 of the accelerometer superconducting body 12 is given by the expression $$F = k_2 B^2 \qquad (2)$$

where $k_2$ is a second constant.

Substituting Expression 1 in Expression 2, clearing and replacing the constants with the constant K results in $$F = KI^2 \qquad (3)$$

From an examination of Equation 3 it can be appreciated that the force acting on the accelerometer body is proportional to the square of the current flowing in the restraining coils 19 and 21. Since the current flowing in one restraining coil is $(I_0 + i)$ where $I_0$ is the constant biasing current and $i$ is the error current after amplification, and the current flowing in the other restraining coil is $(I_0 - i)$, the force acting on the superconducting flange portions 17, 18 of accelerometer body is given by the expression $$F = K(I_0 + i)^2 - K(I_0 - i)^2 \qquad (4)$$

due to the fact that the forces produced by the two coils are acting in opposite directions.

By clearing and transposing Equation 4, it can be seen that $$i = \frac{F}{4KI_0} \qquad (5)$$

Since the bias current $I_0$ is maintained constant by the constant current source, it can be appreciated from Equation 5 that the error current $i$ is proportional to the accelerating force F.

A second form of force measuring circuit suitable for use with the accelerometer of FIGURE 1 is shown in FIGURE 4 of the drawings. The accelerating force measuring circuit of FIGURE 4 employs a pulse torquing technique wherein reversely acting restraining coils 19 and 21 of the accelerometer are selectively pulsed with constant amplitude electric current pulses to maintain the armature or body member 12 of the accelerometer close to its reference position while the accelerometer is being subjected to an accelerating force. For this purpose the restraining coils 19 and 21 are connected in an electric circuit which includes an electronic switch 51, a reference coil 52, and a source of direct current electric energy 53 coupled through a movable potentiometer arm 54 and variable resistor 55 to a pulse inverter. The circuit thus comprised is designed to supply pulsed direct current to either one of the positioning coils 19 and 21 whichever is selected to be closed on the circuit through the electronic switch 51. This causes the coil thus energized to act on the body member 12 of the accelerometer in such a manner as to restrain it. Continuous switching so as to selectively energize one or the other of the restraining coils then serves to maintain the accelerometer body 12 close to its reference position. The electronic switch is of conventional construction and is controlled by the output from a capacitor bridge. The capacitor bridge includes as parts thereof the two sets of capacitive pick-up elements 25, 26 and 27, 28 of the accelerometer, which are connected in a Wheatstone bridge measuring circuit arrangement with a pair of reference capacitors 31 and 32. The opposite terminals of the Wheatstone bridge arrangement across which the error signal appears is connected through a rectifier-amplifier circuit 34 to the electronic switch 51, and serves to actuate that switch to cause it to close on either one of the contacts 21' or 19' depending upon the direction of the error signal. Measurements of the value of the accelerating force to which the accelerometer is subjected may be obtained from a counter 58 and a counter 59 connected across respective ones of the restraining coils 19 or 21. The acceleration is proportional to the number of current pulses per second where the current pulses applied to one restraining coil are considered positive and the current pulses supplied to the other coil are considered negative. The total number of pulses measured from time zero then provides a measure of the obtained speed.

In order to assure that the amplitude of the electric pulses supplied to the restraining coils 19 and 21 remains constant, and hence the force produced by these coils remains constant, a pulse amplitude comparator circuit is provided. This circuit includes a measuring coil 52 positioned opposite a superconductive armature 62 which is also acted on by a superconductive reference coil 68 having a constant current supplied thereto. The reference coil 68 and measuring coil 52 act on armature 62 in opposition and keep it in its middle or reference position if the currents to both coils are equal. Reference coil 68 actually comprises a part of a constant current reference source which further includes a battery 38 connected through an open circuiting switch 44 and variable resistor 39 across the reference coil 68. The circuit comprised by the battery 38, switch 44 and resistor 39 is bypassed by a superconducting gate element 41 which is surrounded by a control winding 42. By this arrangement, a constant value circulating current can be frozen into the closed circuit formed by the reference coil 68 and the superconducting gate 41 in the manner described with relation to the species of the invention shown in FIGURE 3. Thereafter, the constant value circulating or reference current flowing through the reference coil 68 will produce a constant force acting on the superconductive armature 62. The amplitude of this constant value reference current is adjusted to just about equal the mean amplitude of the pulses of current being supplied through the electron switch 51 to the measuring coil 52. Hence, the forces produced by these two coils will be balanced where the amplitude of the electric signal pulses supplied from the electronic switch 56 are at their preassigned values. Thereafter if the amplitude of the current pulses supplied to positioning coils 19 and 21 varies up or down, the force produced by the measuring coil 52 will either exceed or be less than the force produced by the second reference coil 68. This variation in the two forces then causes the superconductive armature 62 to deviate somewhat from its reference position.

In order to derive a measurement of the deviation of armature 62, a capacitive pick-up is arranged adjacent the superconductive armature 62. The capacitive pick-up comprises two sets of capacitive pick-up elements 63 and 64 which are physically disposed adjacent the superconductive armature 62 in confronting relation so that movement of the armature will vary the capacitance by varying the space between the pick-up elements 63, 64 and the armature. This variation in capacitance is detected in a capacitance bridge further comprised by a pair of capacitors 65 and 66 connected in a Wheatstone bridge arrangement with the capacitive pick-up elements 63 and 64. The bridge is excited from a source of alternating current potential 67 connected across one set of opposed terminals of the bridge, and any deviation signal appearing across the remaining pair of opposite terminals of the bridge is coupled through a high gain amplifier 69 to a motor 57 that drives the movable contact arm 54 along variable resistor 55. Accordingly, variation of the armature 62 from its reference position will produce an error signal that is amplified and causes motor 57 to move contact arm 54 along the resistor 55 and thereby adjust the amplitude of the electric signal pulses being supplied to the positioning coils 19 and 21 to cause these current pulses to remain constant in value as measured against the constant current flowing in reference coil 68. As long as this situation holds, then the current being supplied to the restraining coils 19 and 21 will produce constant pulse forces that act against the superconductive accelerometer body. Hence by counting the number of pulses supplied to each restraining coil 19 and 21 with counters 58 and 59, a measurement of the acceleration will be obtained, and the total number of such pulses supplied from time zero will represent the velocity of the body.

Figure 5:
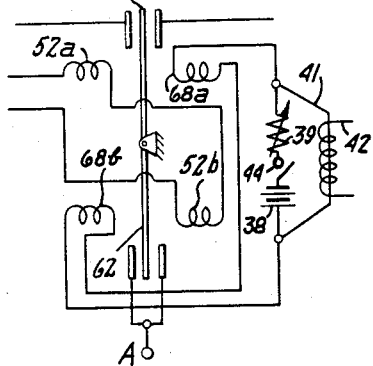
FIGURE 5 is still a second form of measuring arrangement for use with the circuit of FIGURE 4.

A second form of amplitude comparison circuit suitable for use with the arrangement of FIGURE 4 is shown in FIGURE 5. In the arrangement of FIGURE 5, a measuring coil is divided into two winding halves 52a and 52b and arranged to operate on a centrally pivoted superconductive armature 62. A reference coil comprised by two winding halves 68a and 68b is positioned to act upon the armature 62 in opposing relation to the measuring coil winding halves 52a and 52b. The arrangement is then incorporated in the pulse torquing circuit of FIGURE 4, and will operate in the same manner as the current comparator circuit portion of FIGURE 4 of the circuit with the exception that improved sensitivity is obtained because of the balanced forces acting on the superconductive armature 62. So long as the mean amplitude of the current pulses supplied through the measuring coils 52a and 52b equal the amplitude of the current flowing in the reference coils 68a and 68b, the armature 62 will be maintained in its reference position. However, should the mean amplitude of the current pulses supplied to the first reference coils 52a or 52b fall above or below the selected median value, then the armature 62 will deviate from its reference position to cause an error current to be supplied from a capacitance measuring bridge arrangement similar to that shown in FIGURE 4 through an amplifier 69 to a motor 57 that corrects the amplitude of the current pulses supplied to the restraining coils 19 and 21 to maintain them constant as measured against the constant current flowing in reference coil 68.

Figure 6:
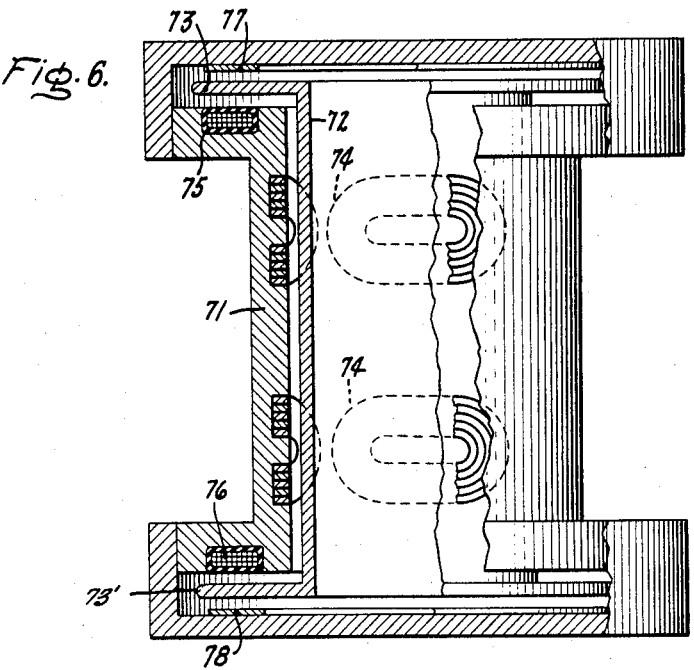
FIGURE 6 is a partially broken away side view of a second embodiment of a superconductive accelerometer constructed in accordance with the invention.

A second form of superconductive accelerometer constructed in accordance with the invention is shown in FIGURE 6 of the drawings. The accelerometer shown in FIGURE 6 comprises a cylindrical spool-shaped outer housing 71 which may be fabricated from brass, stainless steel, or other suitable material. Supported within the housing 71 is a cylindrical spool-shaped armature or body member 72 fabricated from a superconducting material, and having integrally formed outstanding end flanges 73 and 73'. The superconducting body member 72 is supported within the housing 71 by a plurality of elliptically shaped superconductive bearing coils 74 which are spaced around the periphery of each end of the housing member 71. There are preferably two sets of four bearing coils with each set having one coil in each quadrant of the periphery of the housing member 71, and the sets being arranged on opposite ends of the housing. By this arrangement, the armature or body member 72 will be floatingly supported in a radial direction within the outer housing 71 entirely free of any mechanical engagement. When thus positioned, the outstanding flange portions 73 and 73' are located opposite a set of longitudinal restraining coils 75 and 76 supported in the outstanding ends of the spool-shaped housing 71. The restraining coils 75 and 76 comprise a plurality of turns of relatively thin cross-section superconducting wire wound in the form of a coil that extends around the entire periphery of the outer housing 71 in confronting relation with the outstanding flange portions 73 and 73' of accelerometer body 72. By this arrangement, the restraining coils when energized from an electric current source will produce a magnetic flux that operates against the superconducting flanges 73 and 73' in accordance with the well known bearing principle to cause these flanges to position the accelerometer body member 72 in a reference position along its longitudinal axis. In order to measure any longitudinal movement of the accelerometer body member 72 relative to its reference position, a set of electric pick-ups 77 and 78 are secured on the outer housing member 71 in confronting relation with the remaining surface of the outstanding flanges 73 and 73', respectively. By this arrangement, electric pick-up elements 77 and 78 in conjunction with the superconducting surface of the outstanding flanges 73 and 73' which they confront comprise capacitive pick-ups which may be electrically connected through suitable conductors (not shown) in a capacitive measuring bridge arrangement such as shown in FIGURES 3 and 4 of the drawings.

In operation, the embodiment of the invention shown in FIGURE 6 functions in precisely the same fashion as that described with relation to FIGURE 1 when the accelerometer is subjected to an accelerating force, and it is not believed necessary to again describe in detail the manner in which such operation is accomplished.

Figure 7:
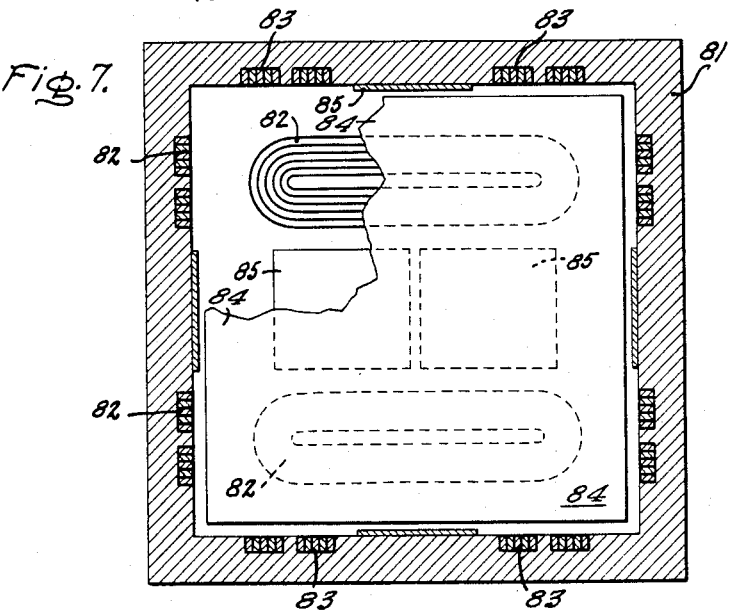
FIGURE 7 is a sectional view of still a third form of superconductive accelerometer constructed in accordance with the invention.

Still another form of accelerometer constructed in accordance with the invention is shown in FIGURE 7 of the drawings. The accelerometer shown in FIGURE 7 is adapted to develop a three-dimensional measurement of the accelerating force to which the accelerometer is subjected. For this purpose the accelerometer comprises a cubically-shaped housing member 81 of steel, brass or similar material having a plurality of elliptically-shaped superconductive restraining coils 82 and 83 secured to the six interior surfaces thereof. The restraining coils 82, 83 are formed from superconducting wire and are supported within housing member 81 in confronting relationship with a cubically-shaped body member 84 fabricated from superconducting materials. The restraining coils 82 serve to maintain the cubically-shaped accelerometer or body member 84 located close to a reference position with respect to the three transverse axes. In order to detect any movement of the accelerometer armature or body member 84 relative to this reference position a plurality of electric pick-up members 85 are provided which are mounted on all six interior surfaces of the housing 81 in confronting relation with the body member 84. Electric pick-up members preferably comprise sets of two superconducting square plates with one set of pick-up members being disposed on each of the six interior surfaces of the cubically-shaped housing 81. By this arrangement, should the accelerometer of FIGURE 7 be subjected to an accelerating force from any direction, movement of the accelerometer armature body member 84 along any one of three transverse axes from its reference position would be detected by electric pick-up elements 85. These electric pick-up elements may be connected in three different capacitive measuring circuit arrangements such as those shown in FIGURE 3 or 4 of the drawings for deriving output error signals indicative of an accelerating force acting along any one of the three directional axes. These output error signals are then amplified in a high gain amplifier to produce a corrective current that is supplied back to the respective restraining coils associated with a particular pair of capacitive pickup elements to cause the coils to return the superconductive accelerometer body 84 close to its reference position. This error current also provides a measurement of the acceleration of the body in one dimension so that all three currents provide a three dimensional measurement of the accelerating force to which the accelerometer is subjected.

Figure 8:
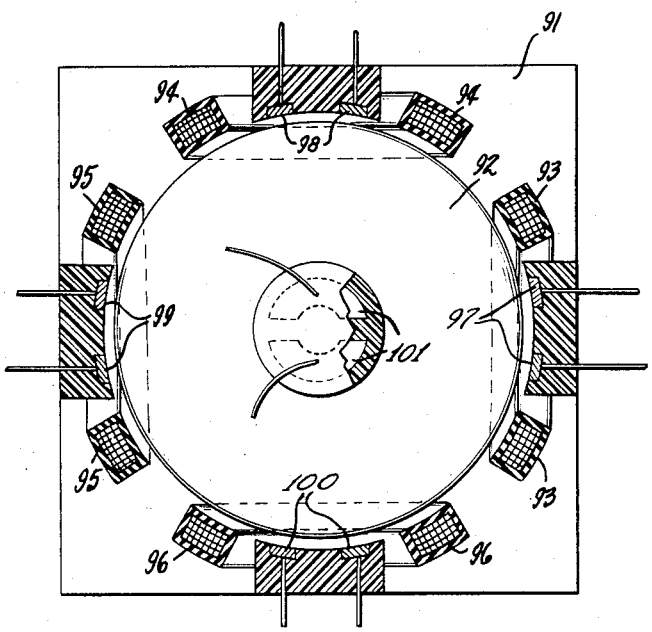
FIGURE 8 is a sectional view of still another superconductive accelerometer which employs a spherically-shaped armature body.

A second form of three dimensional superconductive accelerometer constructed in accordance with the invention is shown in FIGURE 8 of the drawings. The accelerometer shown in FIGURE 8 comprises a cubically-shaped housing member 91 fabricated from brass, stainless steel or other suitable material. The housing member 91 has a spherically-shaped superconductive armature member 92 magnetically supported therein which is restrained within housing 91 by means of the plurality of magnetic restraining coils 93 through 96. The restraining coils 93-96 are formed of a large number of turns of relatively thin cross-section superconducting wire wound in the form of a circular coil and secured within circularly-shaped slots formed in the interior surface of the housing member 91 in confronting relation with the superconductive armature member 92. The restraining coils 93 through 96 are shaped in the manner shown by the dotted lines in FIGURE 8 and actually extend over approximately a quadrant of the spherically-shaped armature member 92 so as to magnetically support the armature within the housing 91. In actuality, there are two other such restraining coils (not shown) which restrain the spherically-shaped superconductive armature member 92 in the plane perpendicular to the plane of the drawings; however, for the purpose of clarity and convenience these additional restraining coils have not been illustrated.

In order to detect any incipient movement of the superconductive armature member 92 that might be caused by an accelerating or decelerating force, a plurality of capacitive pick-up elements 97 through 101 are provided. These capacitive pick-up elements in conjunction with the superconductive surface of the armature member 92 comprise capacitors which are connected in capacitance measuring bridge arrangements such as those illustrated in FIGURES 3 and 4 of the drawings. The capacitive pick-up elements when thus connected operate to derive an output error current indicative of any change in the capacitance in the space existing between the superconductive armature member 92 and the capacitor pick-up elements 97 through 101. These error currents are amplified in appropriate high gain amplifier, and supplied back to the restraining coils 93 through 96 together with a bias current (if appropriate) to either increase or decrease the amount of current supplied to the restraining coils. This results in returning the superconductive armature member 92 back close to its reference position. It is believed obvious that the error signal derived from the capacitive pick-up elements 97, 99 will represent the value of the accelerating force existing in the dimension extending along the $x$ axes of the accelerometer, and the value of the error signal developed by the capacitive pick-up elements 98, 100 will represent the accelerating force extending along the $z$ axes of the accelerometer. Likewise, the $y$ axes accelerating force will be derived by a set of capacitive elements one of which is shown in a partial sectional view as 101, which will be coacting with the previously mentioned two restraining coils (also not shown) that coact on the superconductive armature member 92 in a direction perpendicular to the plane of the drawing. Accordingly, it can be appreciated that the error signal derived by all three sets of capacitive pick-up elements will provide a three-dimensional measurement of the accelerating force acting on the accelerometer.

From a consideration of the above description it can be appreciated that the invention provides a new and improved superconductive accelerometer which employs a novel constant bias current reference principle to develop a measurement of an accelerating force to which the accelerometer is subjected. This constant bias current is added to an error current in one restraining coil and subtracted from the error current in a second restraining coil to develop a counter force to the accelerating force and a comparison of the two forces is achieved to derive the required measurement of the accelerating force to which the body is subjected. Because of this novel principle of the force measurement, it has been established that accelerometers can be constructed which are extremely sensitive to change in an accelerating force and which are capable of attaining the high accuracies required by accelerometer devices for use in present day guidance systems. Additionally by appropriate modification, the accelerometer can be adapted to provide a three-dimensional measurement of an accelerating force.

Having described several embodiments of a new and improved superconductive accelerometer constructed in accordance with the invention, it is believed obvious that many modifications and variations of the present invention are possible in the light of the above teachings. It is therefore to be understood that changes may be made in the particular embodiments of the invention described which are within the full intended scope of the invention as defined by the appended claims.

What I claim as new and desire to secure by Letters Patent of the United States is:

1. In a three-axis accelerometer, a case, a proof mass having a pair of opposite broad surfaces made of material which becomes superconductive at a cryogenic temperature, normal to each of three mutually orthogonal axes, three pairs of support coils made of material which becomes superconductive at cryogenic temperatures, three pairs of capacitive pick-off means, each of said support coils and pick-off means being attached to a separate wall of said case opposite one of said broad surfaces, each of said pairs of coils and said pairs of pick-off means being positioned normal to a separate one of said axes, means for maintaining said case and its contents at a cryogenic temperature, means for developing a separate control current connected to each of said pairs of coils for maintaining said proof mass in a balanced position magnetically supported in said case, and A.-C. power source means connected to each of said pairs of pick-off means, each said current developing means being operatively connected to an associated pair of said pick-off means.

2. An accelerometer comprising a body, a housing disposed around said body, means mounted in said housing for magnetically suspending said body within said housing, said body having at least two superconductive surfaces positioned for limited movement relative to a reference position, electrical means for producing a magnetic flux which acts against said superconductive surfaces for positioning said surfaces with respect to said reference position, said superconductive surfaces being held in said suspended position for limited movement about said reference position by the opposing forces generated between said electrical means and counter electrical currents induced in said superconductive surfaces by said magnetic flux, electrical pickup means physically disclosed adjacent said surfaces for detecting incipient movement of said surfaces and deriving an electric error signal representative of such movement, high gain amplifying means electrically connected to said electrical pickup means and to said electrical flux producing means for amplifying said error signal and supplying the amplified current to said flux producing means for maintaining said surfaces relatively close to said reference position, an indicating means operatively coupled to said electrical pickup means for producing an indication of the value of that error signal as a measure of acceleration.

3. An accelerometer comprising a body, a housing enclosing said body, means mounted in said housing for magnetically suspending said body within said housing, said body having at least two superconducting surfaces positioned for limited movement relative to a reference position, superconductive electrically operable field producing means mounted in said housing for producing a magnetic flux which acts against said superconductive surfaces for restraining said superconductive surfaces close to said reference position, said superconductive surfaces being held in a suspended position and restrained to limited movement about said reference position by the opposing forces generated between said magnetic field producing means and the counter electrical currents induced in said superconductive surface by said magnetic flux, electrical pickup means physically disposed adjacent said body for detecting incipient movement of said surfaces in deriving an electric error current representative of such movement, amplifying means coupled to said magnetic field producing means and said pickup means for amplifying the error current and supplying it to said magnetic field producing means, a source of constant bias current for coacting with said error current to maintain said superconductive surface close to said reference position, and indicating means operatively coupled to said electrical pickup means for producing an indication of the value of said error current as a measure of acceleration.

4. An accelerometer comprising a superconducting body, a housing enclosing said superconducting body, magnetizing field producing bearing coils mounted within said housing and positioned around said body for magnetically coacting with the magnetic flux associated with counterelectrical currents induced in the outer surface of said superconductive body by said magnetizing field so that said superconductive body is supported within said housing free of any machenical engagement, said superconducting body including integral extending portions movable to a limited extent along at least one directional axis relative to a reference position, superconducting restraining coils mounted within said housing adjacent said extending portions for producing a restraining magnetic flux acting against said extending portions and along one directional axis of said superconducting body for restraining it close to said reference position, electrical pickup means physically disposed adjacent the extending portions of said superconductive body for detecting incipient movement of said body in deriving an electric error signal representative of such movement, high gain amplifying means electrically connected to said pickup means and to said restraining coils for amplifying the error current and supplying the amplified error current to said restraining coils for maintaining the extending portions of said superconducting body relatively close to the reference position, indicating means operatively coupled to the output of said amplifying means for producing an indication of the value of said error signal as the measure of acceleration, and a source of constant electric bias current operatively coupled to said restraining coils for adding to and subtracting from an error current in a manner to produce the results of magnetic force proportional to an accelerated force and effective to maintain the extending portions of said superconducting body close to said reference position.

5. The combination set forth in claim 4 wherein said superconducting body is cylindrically shaped and the extending portions thereof are flanges on the end of said body that are acted upon by the magnetic field produced by the restraining coils and which coact with the electrical pickup means, said restraining coils and electrical pickup means being positioned on the interior of said housing in a position closely adjacent to said flanges, said housing also being cylindrically shaped with the bearing coils being arranged radially around the interior of the house in opposing relation to magnetically support the superconductive body in a radial direction.

6. An accelerometer comprising a cylindrically shaped housing having a plurality of magnetic field producing bearing coils supported about the inner periphery of said housing, each of said bearing coils comprising a saddle shaped coil formed of a few turns of relatively large cross-section superconductors supported on an iron core mounted on the interior of said housing, a transformer comprising a primary winding formed of a large number of turns of relatively thin diameter superconductive wire shaped into a large coil and a secondary winding comprised of a few turns of relatively large cross-section superconductors adapted to be inductively coupled to the secondary winding, said secondary winding being electrically connected to the bearing coils, there being one transformer for each set of peripherally arranged bearing coils, a cylindrically shaped superconductive body supported within said housing in a radial direction by said magnetic bearings free from any mechanical engagement, said superconductive body having a pair of spaced apart superconducting flanges extending about the midportion of said superconductive body, a pair of superconductive restraining coils mounted around the periphery of the interior of said housing in confronting relation with respect to a pair of opposing surfaces of said spaced apart flanges for locating said superconductive body longitudinally relative to a reference position, and a pair of electrical pick-up elements disposed in confronting relation to the remaining opposing surfaces of said superconducting flanges for detecting longitudinal movement of said superconductive body and deriving an electric error signal representative of such movement.

7. The combination set forth in claim 6 further characterized by high gain amplifying means electrically connecting the output error signal from said electrical pickups in bucking relation to a constant bias current supplied to one of said superconducting restraining coils and in aiding relation with the constant bias current supplied to the remaining one of said superconducting restraining coils, and indicating means coupled to said last mentioned means for producing an indication of the value of said output error signal as a measure of acceleration.

8. The combination set forth in claim 6 further characterized by a source of pulsating electric signals, amplitude control means for varying the amplitude of said pulsating electric signals, switch means for selectively coupling said source of pulsating electric signals to either one of said pair of superconducting restraining coils for selectively energizing the same to cause the superconducting body to be maintained close to its reference position, said switch means being operatively coupled to and actuated by said electrical pick-ups, a superconducting measuring coil operatively coupled in circuit relationship with said source of pulsating electric signals and said restraining coils through said switch means, a movable superconducting armature connected in an energization circuit for said amplitude control circuit, a source of constant reference current including a superconducting reference coil, said superconducting measuring and reference coils being arranged on opposite sides of said armature and operating in opposing relation on said armature to maintain the amplitude of said pulsating electric signals constant, and indicating means operatively coupled to said positioning coils for deriving an indication of the number of electrical pulses supplied thereto as a measure of acceleration.

References Cited by the Examiner

UNITED STATES PATENTS

| | | | |
|---|---|---|---|
| 2,591,921 | 4/1952 | Cosgriff et al. | 73—516 |
| 2,840,366 | 6/1958 | Wing | 73—503 |
| 2,871,703 | 2/1959 | Walker | 73—517 X |
| 2,888,256 | 5/1959 | Sedgfield | 73—517 |
| 2,916,279 | 12/1959 | Stanton | 73—503 |
| 2,919,583 | 1/1960 | Parker | 73—517 X |
| 2,942,479 | 6/1960 | Hollmann | 73—517 X |
| 2,943,493 | 7/1960 | Ten Bosch et al. | 73—516 |
| 2,968,952 | 1/1961 | Stalder | 73—517 |
| 3,015,960 | 1/1962 | Steele | 73—517 |
| 3,026,151 | 3/1962 | Buchhold | 308—10 |

OTHER REFERENCES

"Introduction to Solid State Physics," by Charles Kittel, 2nd edition published 1956 by John Wiley & Sons, pages 452, 453, 458 and 459 relied on.

RICHARD C. QUEISSER, *Primary Examiner.*

SAMUEL LEVINE, S. FEINBERG, ROBERT L. EVANS, JOSEPH P. STRIZAK, *Examiners.*

J. J. GILL, L. L. HALLACHER, *Assistant Examiners.*